(12) United States Patent
Nagao et al.

(10) Patent No.: US 7,663,779 B2
(45) Date of Patent: Feb. 16, 2010

(54) IMAGE PROCESSING APPARATUS, IMAGE PROCESSING METHOD AND PROGRAM THEREFOR

(75) Inventors: Takashi Nagao, Kanagawa (JP);
Noriaki Seki, Kanagawa (JP);
Yoshiharu Hibi, Kanagawa (JP);
Masaru Okutsu, Kanagawa (JP);
Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 820 days.

(21) Appl. No.: 10/640,247

(22) Filed: Aug. 14, 2003

(65) Prior Publication Data
US 2004/0125387 A1 Jul. 1, 2004

(30) Foreign Application Priority Data
Dec. 27, 2002 (JP) ............................ 2002-379236

(51) Int. Cl.
*G06K 15/02* (2006.01)
*G06K 9/42* (2006.01)

(52) U.S. Cl. .................. 358/1.2; 358/1.9; 358/3.26; 358/3.27; 358/1.15; 358/451; 382/256; 382/255; 382/286; 382/167

(58) Field of Classification Search ............. 358/1.2, 358/1.9, 451, 3.26, 3.27, 518, 426.02, 426.04, 358/426.06, 426.07, 426.13, 426.14, 2.1, 358/3.12, 296, 1.15; 382/166, 232, 243, 382/244, 246, 218, 260, 148, 275, 203, 252, 382/298, 299, 300, 255, 256, 286, 167; 700/2, 700/20; 345/156, 76, 82, 613
See application file for complete search history.

(56) References Cited

U.S. PATENT DOCUMENTS

| | | | | |
|---|---|---|---|---|
| 4,783,840 A | * | 11/1988 | Song | 382/261 |
| 5,553,201 A | * | 9/1996 | Muramatsu | 358/1.9 |
| 6,831,755 B1 | * | 12/2004 | Narushima et al. | 358/1.9 |
| 6,980,326 B2 | * | 12/2005 | Tsuchiya et al. | 358/1.9 |
| 2001/0040684 A1 | * | 11/2001 | Takahashi | 358/1.2 |
| 2001/0055066 A1 | * | 12/2001 | Nozawa | 348/240 |

(Continued)

FOREIGN PATENT DOCUMENTS

JP    A 5-207266    8/1993

(Continued)

OTHER PUBLICATIONS

Method and Device for Image Processing and Storage Medium, 2001-298610, JP, Apr. 13, 2001, by Kimura Shunpei.*

*Primary Examiner*—David K Moore
*Assistant Examiner*—Steven Kau
(74) *Attorney, Agent, or Firm*—Oliff & Berridge, PLC (57) ABSTRACT

When the size output for an image is equal to or smaller than a predetermined value (e.g., index printing), a printing apparatus performs an image expansion/reduction process by using an interpolation method whereby high speed processing is enabled while an inferior image quality is provided, or when the output size is greater than a predetermined value (e.g., the normal printing of a single sheet), employs an interpolation method for a high quality image to perform the expansion/reduction. Further, when the output image size is equal to or smaller than the predetermined value, the printing apparatus 1 skips the noise reduction process and the sharpening process to increase the processing speed.

6 Claims, 6 Drawing Sheets

U.S. PATENT DOCUMENTS

2002/0131652 A1 * 9/2002 Yoda .......................... 382/309

FOREIGN PATENT DOCUMENTS

| JP | 2001-298610 | * | 4/2000 |
| JP | B 3065855 | | 5/2000 |
| JP | A-2001-216124 | | 8/2001 |
| JP | A-2002-077594 | | 3/2002 |
| JP | A 2002-199208 | | 7/2002 |

* cited by examiner

IMAGE PROCESSING APPARATUS, IMAGE PROCESSING METHOD AND PROGRAM THEREFOR

BACKGROUND OF THE INVENTION

1. Field of the Invention

The present invention relates to an image processing apparatus and an image processing method for digital image processing performed in consonance with an output image size, and a program therefor.

2. Description of the Related Art

Since digital cameras have become popular, and services at photo print shops are now available for which photographs are used in the production of CD-ROMs, users can easily obtain digital image data. Further, since the home use of high-quality image printers has spread, and multi-function color printing systems are now installed in photo print shops, even in convenience stores, there has been a dramatic increase in the opportunities afforded users to employ the available environment to display/print digital images.

In this situation, wherein images having various sizes are distributed and displayed/printed, the expansion and reduction processes are required. In addition, since for images photographed by users the exposure, focusing and color balance tend to be inappropriate, image restoration, such as is performed during the picture printing process, is also required.

However, as the number of pixels provided for a digital still camera is increased, an image restoration process that requires an especially complicated image analysis imposes a very large load. Further, the expansion/reduction process must employ, to a degree, a high quality image method in order to clearly display/print an image obtained using a large number of pixels. Because of these factors, an extended period of time is required to clearly display/print an digital image.

To solve this problem, a relevant technique is available whereby the order in which editing processes, such as the reduction and color conversion processes, are performed is changed, in accordance with the type of editing that must be performed, to reduce the number of pixels that must be processed as disclosed in JP-A-5-207266.

Another technique is available whereby a reduction process is performed first when an output image size is smaller than an input image size, or an expansion process is performed later when the output image size is larger than the input image size, so that the required amount of processing memory can be reduced, and the processing speed can be increased as disclosed in JP-A-2002-199208.

The objective of the technique in JP-A-2000-199208 is to reduce the amount of processing memory and to increase the processing speed merely by performing the reduction process first, when the output image size is smaller, and by performing the expansion process later, when the output image size is greater. However, the following problems occur when the nearest neighbor method, which is the most common expansion/reduction method, is employed, and when an image is comparatively large, such as a size L, and is to be printed by a printer by which the resolution is increased even more. Since to obtain an enlarged image the pixels are merely expanded, for a flat portion, the borders between blocks composed of pixels having the same value are noticeable and an angular impression is provided, and for an edge portion, the linear edges are step shaped and have a jagged appearance, so that the image quality is poor.

And when image reduction is performed, jaggies occur and further deteriorate the image quality. To eliminate these problems, high quality image expansion/reduction methods, such as a bi-linear interpolation method and a cubic convolution method, have been proposed, and when one of these methods is employed for the processing, a preferable image quality can be expected.

However, for index printing for which many images having reduced sizes are laid out for a single sheet and printed, the processing speed is reduced because high quality image expansion/reduction is unnecessarily performed, even when the image quality defect is almost unnoticeable.

The same problems are encountered during the image restoration process. That is, since the same process is performed as is used to output a large image, depending on the size of an output image, the processing speed is reduced even when there is no discernible difference in the image quality.

As is described above, as the objective of this method, the order in which of the expansion/reduction process and the image restoration process is changed while taking into account only an increase or decrease in the number of pixels in an image, and a processing order is selected that increases the processing speed and saves memory. However, as described above, since no consideration is given as to whether there is any discernible difference in the quality of an image thus generated, either a poor quality image is generated, or an unnecessary high quality image process is performed that causes a reduction in the processing speed.

SUMMARY OF THE INVENTION

To resolve these shortcomings, according to the objective of the present invention, when the output image size is large enough for a difference in the image quality to be visually identified, the expansion/reduction process and the image restoration process are performed to provide a high quality image, whereas when the output image size is too small for a difference in the image quality to be visually identified, the expansion/reduction process and the image restoration process are performed at high speed, or a part of the image restoration process is skipped, so that the acquisition both of a satisfactory image quality and a satisfactory processing speed can be realized.

To achieve this objective, according to one aspect of the present invention, an image processing apparatus includes: a first image expansion/reduction unit for employing a first method to change the size of a digital image; a second image expansion/reduction unit for employing a second method to change the size of a digital image; and a controller for selecting either the first image expansion/reduction unit or the second image expansion/reduction unit in accordance with the output size of a digital image.

Preferably, the first image expansion/reduction unit changes the size of a digital image at a higher image quality than the second image expansion/reduction unit does, and the controller selects the first image expansion/reduction unit when the output size of the digital image is greater than a predetermined value, or selects the second image expansion/reduction unit in other cases.

Preferably, the second image expansion/reduction unit changes the size of a digital image at a higher speed than the first image expansion/reduction unit does, and the controller selects the first image expansion/reduction unit when the output size of the digital image is greater than a predetermined value, or selects the second image expansion/reduction unit in other cases.

Preferably, the image processing apparatus further includes: an image restoration unit for performing image restoration for a digital image, wherein the controller changes the contents of the image restoration process performed by the image restoration unit in accordance with the output size of a digital image.

Preferably, when the output size of the digital image is greater than the predetermined value, the controller permits the image restoration unit to perform a color correction process and a sharpening process at a specific image quality, and in the other cases, permits the image restoration unit to perform the color correction process and/or the sharpening process at a lower image quality than the predetermined image quality.

Preferably, the image restoration unit performs the color correction process, the sharpening process and a noise reduction process. When the output size of the digital image is greater than the predetermined value, the controller permits the image restoration unit to perform the color correction process, the sharpening process and the noise reduction process, and in the other cases, inhibits, at the least, the performance of either the sharpening process or the noise reduction process by the image restoration unit.

Preferably, the image processing apparatus further includes: a parameter setup unit for setting correction parameters based on a reduced image for a digital image, or an image segment extracted from the digital image, wherein the image restoration unit performs either the color correction process and/or the sharpening process in accordance with the correction parameters.

Preferably, the image processing apparatus further includes: a reading unit for reading, from a plurality of additional data sets accompanying a digital image, one set of additional data consonant with the output size of the digital image, wherein the image restoration unit performs the image restoration process in accordance with the additional data obtained by the reading unit.

Preferably, the first and the second image expansion/reduction units perform an expansion or reduction process for a first direction in a digital, image and a second direction perpendicular to the first direction. The controller permits the first and the second image expansion/reduction units and the image restoration unit to respectively perform the expansion or reduction process for the first direction, the expansion or reduction process for the second direction, and the image restoration process, in the order in which the number of pixels to be processed for a digital image is minimized.

Preferably, the first and the second image expansion/reduction units reduce a digital image based on an interpolation coefficient providing noise reduction effects, and when the reduction process is performed based on the interpolation coefficient providing the noise reduction effects, the controller inhibits the performance of the noise reduction process by the image restoration unit.

Preferably, the first and the second image expansion/reduction units expand a digital image based on an interpolation coefficient providing sharpness enhancing effects, and when the expansion process is performed based on the interpolation coefficient providing the sharpness enhancing effects, the controller inhibits the performance of the sharpening process by the image restoration unit.

According to another aspect of the invention, an image processing apparatus includes: an image expansion/reduction unit for changing the size of a digital image; an image restoration unit for performing an image restoration process for the digital image; and a controller for, in accordance with the output size of the digital image, controlling the contents of the image restoration process performed by the image restoration unit.

Preferably, the image restoration unit performs a color correction process for the digital image, and in accordance with the output size of the digital image, the controller controls the contents of the color correction process performed by the image restoration unit.

Preferably, the image restoration unit performs a sharpening process for the digital image, and in accordance with the output size of the digital image, the controller controls the contents of the sharpening process performed by the image restoration unit.

The image restoration unit performs a noise reduction process for the digital image, and in accordance with the output size of the digital image, the controller controls the contents of the noise reduction process performed by the image restoration unit.

Preferably, when the size of the digital image changed by the image expansion/reduction unit is greater than a predetermined value, the controller controls the image restoration unit to obtain a higher image quality than in the other cases.

Further, to achieve the objective, according to an additional aspect of the present invention, an image processing method includes the steps of: selecting either a first expansion/reduction method or a second expansion/reduction method in accordance with the output size of a digital image; and changing the size of the digital image using the selected first or second expansion/reduction method.

According to a further aspect of the invention, an image processing method includes the steps of: determining the contents of an image restoration process in accordance with the output size of a digital image; and performing the image restoration process for the digital image based on the contents that have been determined.

According to a still further aspect of the invention, provided is a program that permits a computer included in an image processing apparatus to perform the steps of: selecting either a first expansion/reduction method or a second expansion/reduction method in accordance with the output size of a digital image; and changing the size of the digital image using the selected first or second expansion/reduction method.

According to one more aspect of the invention, provided is a program that permits a computer included in an image processing apparatus to perform the steps of: determining the contents of an image restoration process in accordance with the output size of a digital image; and performing the image restoration process for the digital image based on the determined contents.

Besides, the output size is the size of a digital image output for printing or for display on a monitor.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

A first embodiment of the present invention will now be described while referring to the drawings.

Figure 1:
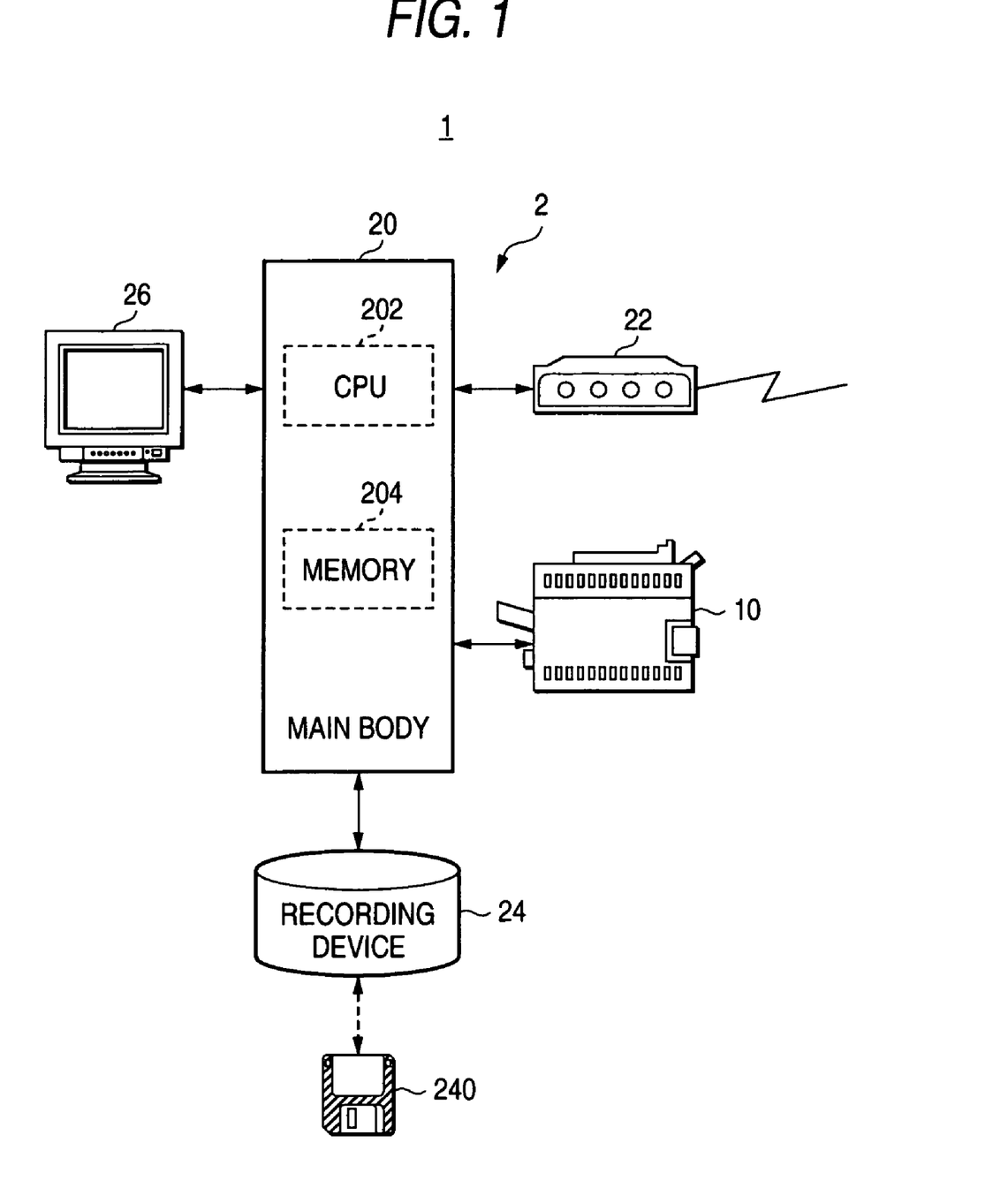
FIG. 1 is a diagram showing the hardware configuration of a printing apparatus employing an image processing method according to the present invention, with a control unit 2 positioned in the center.

FIG. 1 is a diagram showing an example hardware configuration of a printing apparatus employing an image processing method according to the present invention, with a controller 2 positioned as the center piece.

As is shown in FIG. 1, the printing apparatus 1 includes the control unit 2 and a printer 10.

The control unit 2 includes: a main body 20 including a CPU 202 and a memory 204; a communication device 22; a recording device 24, such as an HDD or CD drive; and a user interface device (UI device) 26, including either an LCD display device or a CRT display device, and a keyboard/touch panel.

The printing apparatus 1 receives image data, obtained by a digital still camera or a scanner, through the communication device 22, connected by a USB cable or a LAN cable, or from the recording device 24, into which a removable medium can be loaded. Then, the printing apparatus 1 performs the image processing, such as the expansion/reduction process, in accordance with the number of the pixels and the output size of the received image data, and either outputs the resultant data to the display device of the UI device 26 or prints them on a sheet. At this time, in accordance with the output image size, the printing apparatus 1 selects predetermined expansion/reduction processes from among those for which the processing load or the image quality differ, and executes the selected expansion/reduction processes.

The expansion/reduction processes selected by the printing process 1 include two or more interpolation methods whereby image qualities are obtained that differ. More preferably, the interpolation methods include two or more processing methods for which the interpolation speeds differ. Further, the processing load, such as the memory size required for interpolation, may differ for the interpolation methods selected by the printing apparatus 1.

In this embodiment, the printing apparatus 1 selects the expansion/reduction process from among high image quality expansion/reduction processes that provide a high quality image, even though the speed is low, and high speed expansion/reduction processes that provide a high speed, even though the obtained image quality is low.

Figure 2:
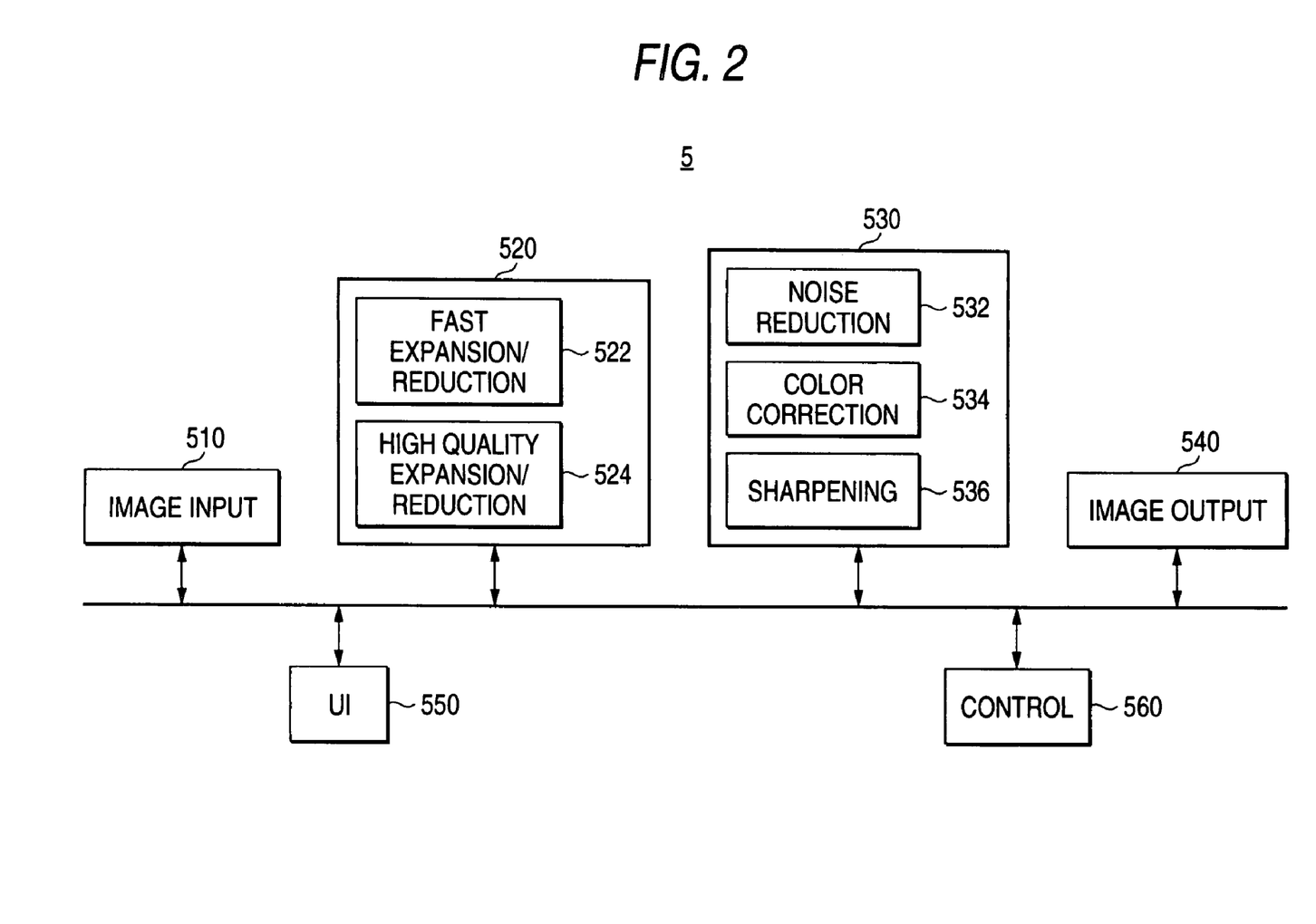
FIG. 2 is a diagram showing the arrangement of an image program according to a first embodiment of the present invention.

FIG. 2 is a diagram showing the arrangement of an image processing program 5 that is executed by the control unit 2 (FIG. 1) to implement the image processing method of the invention. In this embodiment, an explanation will be given specifically for the image processing program 5 that is installed in the control unit 2; however, one part or all of the functions of the image processing program 5 may be provided by special hardware components.

As is shown in FIG. 2, the image processing program 5 includes: an image input unit 510, an expansion/reduction unit 520, an image restoration unit 530, an image output unit 540, a user interface (UI) unit 550 and a controller 560.

The expansion/reduction unit 520 includes a fast expansion/reduction processor 522 and a high quality image expansion/reduction processor 524; and the image restoration unit 530 includes a noise reduction processor 532, a color correction processor 534 and a sharpness correction processor 536.

In the image processing program 5, the image input unit 510 receives externally input image data either through the communication device 22 or from the recording device 24, and interprets the image data and the additional data as a digital image.

The expansion/reduction unit 520 expands or reducts the fetched digital image to the size to be output by the image output unit 540, which will be described later. In this embodiment, the fast expansion/reduction processor 522 and the high quality image expansion/reduction processor 524 are provided for the expansion/reduction unit 520.

For the image expansion/reduction, the fast expansion/reduction processor 522 employs a fast processing method that imposes only a small load. More specifically, a method, such as the nearest neighbor method or the zero-order holding method, is employed whereby the processing can be performed at high speed, even through good image quality is not provided.

On the contrary, an image expansion/reduction method employed by the high quality image expansion/reduction processor 524 is a method whereby a better image quality is provided even through the processing load is largely comparable with the method used by the fast expansion/reduction processor 522. More specifically, the high image quality expansion/reduction processor 524 employs an expansion/reduction method, such as the bi-linear interpolation method, the cubic convolution method or the B-spline interpolation method, whereby an output image having a high quality can be obtained while the processing speed is lower than that provided by the nearest neighbor method.

The image restoration unit 530 performs, for the fetched digital image, image quality improvement processes, such as noise reduction, color correction and the sharpening process. The image restoration unit 530 in this embodiment includes a noise reduction processor 532, a color correction processor 534 and a sharpening processor 536.

The noise reduction processor 532 processes an image using the smoothing method or the edge preserved smoothing method, and reduces the roughness of the image and the noise.

The color correction processor 534 analyzes an image, adjusts the color balance, saturation and contrast, and performs a further correction of memory colors, such as the colors of the sky and human skin, and a red-eye removal process.

The sharpening processor 536 analyzes an image and performs a filtering process to sharpen the image if it is insufficiently sharp.

The image output unit 540 externally outputs the digital image data obtained either by the expansion/reduction unit 520 or the image restoration unit 530. As an example, the image output unit 540 controls the print engine (not shown) of the printer 10 to print a digital image on a sheet, or displays a digital image on the monitor of a computer terminal via the communication device 22.

The UI unit 550 permits the UI device 26 to accept the designated output size of image data that are received from the image input unit 510 and an external instruction for image restoration, and to output the instruction to the controller 560.

The controller 560 controls the operations of the expansion/reduction unit 520 and the image restoration unit 530. As an example, in accordance with the size of the image data output by the image output unit 540, the controller 560 selects the contents of the image expansion/reduction process (high speed or high quality) and the image restoration processes (the noise reduction, the color correction and the sharpening processes).

The controller 560 may determine the output size depending on whether an instruction is accepted to present a plurality of image data sets to be recorded on a sheet for index printing/display or for thumbnail printing/display, or for normal printing/display.

Figure 3:
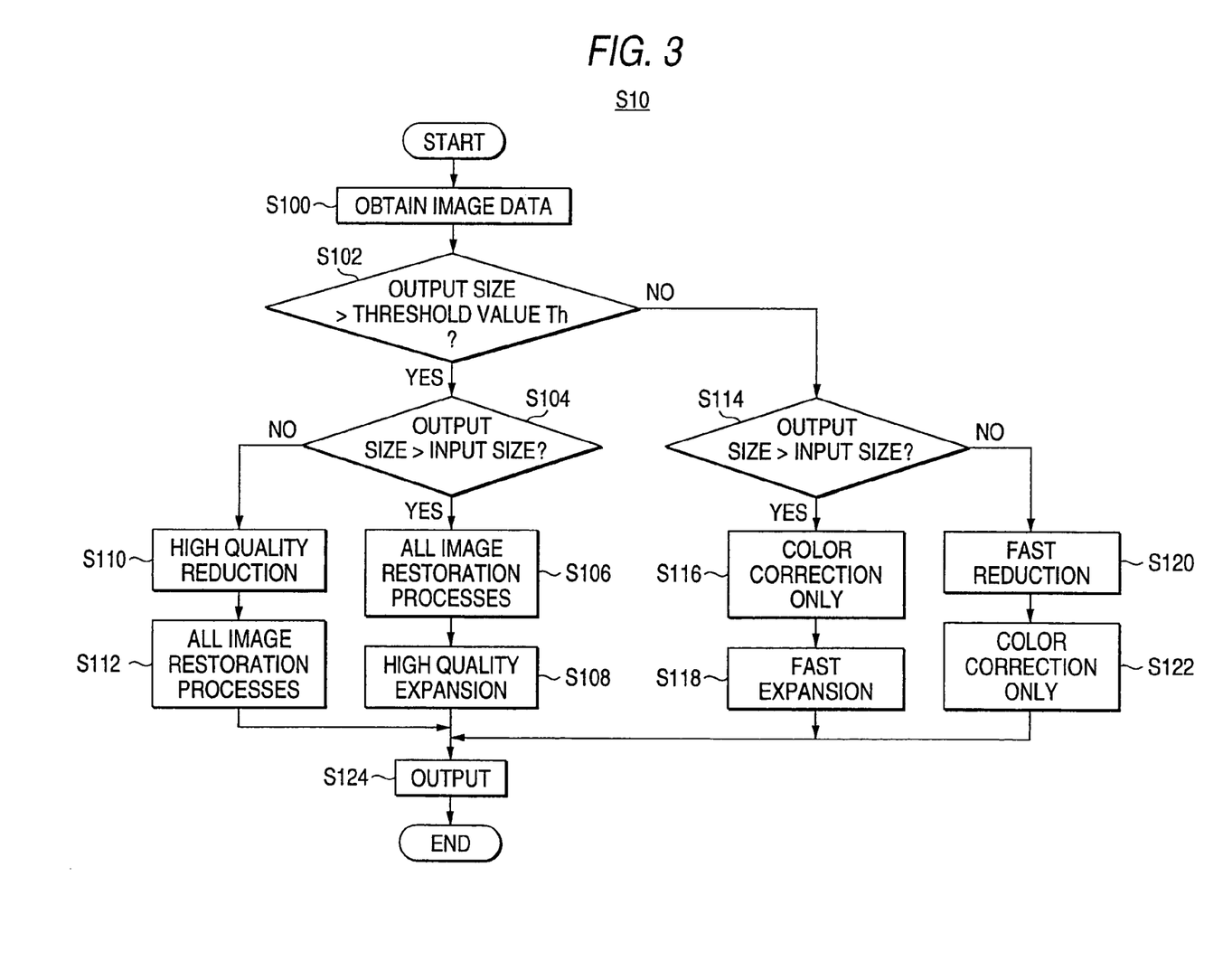
FIG. 3 is a flowchart showing a first operation (S10) performed by the printing apparatus (image processing program)

FIG. 3 is a flowchart showing a first operation (S10) performed by the printing apparatus 1 (image processing program 5).

At step 100 (S100), when the UI unit 550 accepts, through the UI device 26, designated image data to be input and an instruction for an output image size (hereinafter referred to as an output size), the image input unit 510 receives the designated digital image via the communication device 22 or the recording device 24, and obtains attribute information, such as the size of the obtained digital image (hereinafter referred to as an input size).

At step 102 (S102), the controller 560 determines whether the output size obtained, based on the instruction received from the UI unit 550, is greater than a predetermined threshold value Th. When the output size is greater than the threshold value Th, the image processing program 5 advances to S104, or in other cases, is shifted to S114.

In this embodiment, when extremely long lengthwise-or lateral images, which are unlikely to be obtained by a digital camera, are not input, the output size may be regarded as the total number of pixels obtained by multiplying the number of pixels in a row and a column. In another case, the number of pixels in a row and the number in a column may be compared with threshold values provided for the row and the column, and when at least one of the number of pixels in a row or a column is larger than respective threshold value, a true decision (Yes) may be obtained. Furthermore, in this embodiment, the image size is defined by using the number of pixels. However, the objective of the present invention is to switch between the processes, depending on whether a defect in an image can be discerned, while actually, depending on the resolution of a device at an output destination, the size may differ while the number of pixels remains the same. Therefore, the threshold value Th is set in accordance with a human visual characteristic, such as in accordance with the resolution of a device at an output destination.

At step 104 (S104), the controller 560 determines whether the output size is greater than the input size of an image received from the image input unit 510. When the output size is greater than the input size, the image processing program 5 advances to S106, or in other cases, is shifted to S110.

It should be noted that, to simplify the explanation, a comparison of the lengthwise and lateral input sizes with the output size is performed; however, there is a case wherein one of the lengthwise and lateral sizes is greater and the other is not. One of the objectives of the present invention is to increase the processing speed by performing the image restoration process for as small a number of pixels as possible, so when one of the lengthwise and lateral sizes is greater and the other is not, the reduction process is performed first to reduce the number of pixels, and after the image restoration process, the expansion process is performed. Also, while no explanation will be given for a case wherein the lengthwise and/or lateral sizes are equal to the output size, the expansion/reduction process is not performed in such a case.

At step 106 (S106), the image input unit 510 outputs the input image data to the image restoration unit 530, which then performs all of the image restoration processes for the image data. That is, the noise reduction processor 532 performs the noise reduction process for the image data, then the color correction processor 534 performs the color correction process, and finally, the sharpening processor 536 performs the sharpening process for the image data.

When all the image restoration processes have been completed, the image restoration unit 530 outputs the resultant image data to the expansion/reduction unit 520.

At step 108 (S108), the expansion/reduction unit 520 performs the high quality image expansion process for the image data received from the image restoration unit 530 to expand the image data to an output size. That is, under the control of the controller 560, the high quality image expansion/reduction processor 524 expands the input image data and outputs the resultant image data to the image output unit 540.

At step 110 (S110), the image input unit 510 outputs the input image data to the expansion/reduction unit 520, which then reduces the image data to obtain an output size. That is, the controller 560 selects the high quality reduction process, and in accordance with this selection, the high quality expansion/reduction processor 524 reduces the input image data and outputs the obtained image data to the image restoration unit 530.

At step 112 (S112), the image restoration unit 530 performs all the image restoration processes for the image data received from the expansion/reduction unit 520. That is, the noise reduction processor 532, the color correction processor 534 and the sharpening processor 536 perform corresponding image restoration processes for the image data.

When all the image restoration processes have been completed, the image restoration unit 530 outputs the obtained image data to the image output unit 540.

At step 114 (S114), the controller 560 determines whether the output size is greater than the input size of the image received from the image input unit 510. When the output size is greater than the input size, the image processing program advances to S116, while in other cases it is shifted to S120.

At step 116 (S116), the image input unit 510 outputs the input image data to the image restoration unit 530, which then performs the image restoration process for the image data in accordance with the processing contents determined by the controller 560 and outputs the obtained image data to the expansion/reduction unit 520. In this embodiment, the controller 560 selects only the color correction process, and in accordance with this selection, the color correction processor 534 performs the color correction process for the input image data.

This process is performed because while the effects provided for a small image, which is displayed or printed, by the noise reduction process or the sharpening process are either not discernible or are almost impossible to identify, a color balance difference stands out, even for a small image. Thus, the threshold value Th is set to a value that is satisfactory for this condition.

At step 118 (S118), the expansion/reduction unit 520 performs the fast expansion process for the input image data and outputs the resultant image data to the image output unit 540. In this case, the controller 560 selects the fast expansion/ reduction process, and in accordance with this selection, the fast expansion/reduction processor 522 expands the image data at high speed to obtain the output size.

The expansion process performed by the fast expansion/reduction processor 522 is faster than that performed by the high quality expansion/reduction processor 524, but the quality of the image that is provided is low. However, in this case, since a small image suitable for display or printing is obtained when expansion is employed, an image quality difference due to the employment of a different expansion/reduction method is not discernible, or is almost impossible to identify. Further, the threshold value Th is set so as to provide a value that satisfies this condition.

At step 120 (S120), the image input unit 510 outputs the input image data to the expansion/reduction unit 520, which then performs the fast reduction process for the input image data and outputs the obtained image data to the image restoration unit 530. That is, the controller 560 selects the fast expansion/reduction process, and in accordance with this selection, the fast expansion/reduction processor 522 reducts the image data at high speed to obtain the output size.

At step 122 (S122)., the image restoration unit 530 performs the image restoration process for the image data in accordance with the processing contents determined by the controller 560, and outputs the resultant image data to the image output unit 540. In this case, the controller 560 selects only the color correction process, and in accordance with this selection, only the color correction processor 534 performs a corresponding image restoration process for the input image data.

At step 122 (S122), the image output unit 540 externally outputs the received image data to display or print the image data having the designated size.

As is described above, when the size of an image to be displayed or printed is such that a slight difference in the image quality is not discernible or is almost impossible to identify, the printing apparatus 1 performs the fast processing. When an image to be displayed or printed is large enough for detailed portions of the image to be identified, the printing apparatus 1 preforms the high quality processing.

To simplify the explanation for this embodiment, only two categories of image data types, sorted in accordance with their output sizes, have been used. However, the present invention is not thereby limited. In accordance with the visually outstanding level, the number of categories may be increased to three by using the nearest neighbor method, the bi-linear interpolation method and the cubic convolution method, which may be selected as the expansion/reduction methods in order to control the image restoration of more cases, i.e., only the color correction may be performed for a small size, whereas all the restoration processes may be performed for the medium or larger sizes.

Also for simplifying the explanation, an example has been explained wherein the threshold value for selecting the expansion/reduction method is equal to the threshold value for changing the contents of the image restoration process. However, since the objective of the present invention is to avoid the unnecessary use of image processing when a difference in the image quality is not discernible or is almost impossible to identify, when the threshold value differs between the identification of the visual difference caused by the use of the different expansion/reduction methods, and the identification of the visual difference due to the change of the image restoration process, appropriate threshold values are provided and switched, depending on the case.

Second Embodiment

A second embodiment of the present invention will now be described.

In the image restoration process, parameters for the image restoration must be obtained by analyzing the quality of an input image. When the entire image is to be analyzed, however, an extended period of time is required for the analysis, and the overall processing speed is accordingly reduced. Therefore, an explanation will be given for the second embodiment wherein, for the analysis process, an image obtained by reduction is employed, or a part of an input image is extracted and employed.

More specifically, since data such as color distribution for an entire image must be obtained for the color correction process, a reduced image is employed for the analysis process. While for the sharpening process, since in many cases an important object located near the center of an image is focused on, the center portion of the image is extracted for the analysis process.

Furthermore, to support these processes, additional data are stored in the Exif (Exchangeable image file format for digital still cameras), which is the standard image format for digital still cameras. By referring to these data, the parameter for the correction process can be changed, or can be forcibly determined without performing the analysis, or can be set so as not to perform one part or all of the correction process. As is described in the first embodiment of the invention, the correction process is skipped when the image difference can not be visually identified, or is not almost noticeable.

In this case, the reading of the additional data that are related to the skipped portion of the correction process may also be skipped, and only the additional data associated with the correction process to be performed may be read. In this manner, it is also possible to simplify the process for interpreting the additional data of an image transmitted by the image input unit 510.

A modification of the first embodiment of the present invention obtained from this viewpoint will be explained as the second embodiment.

Figure 4:
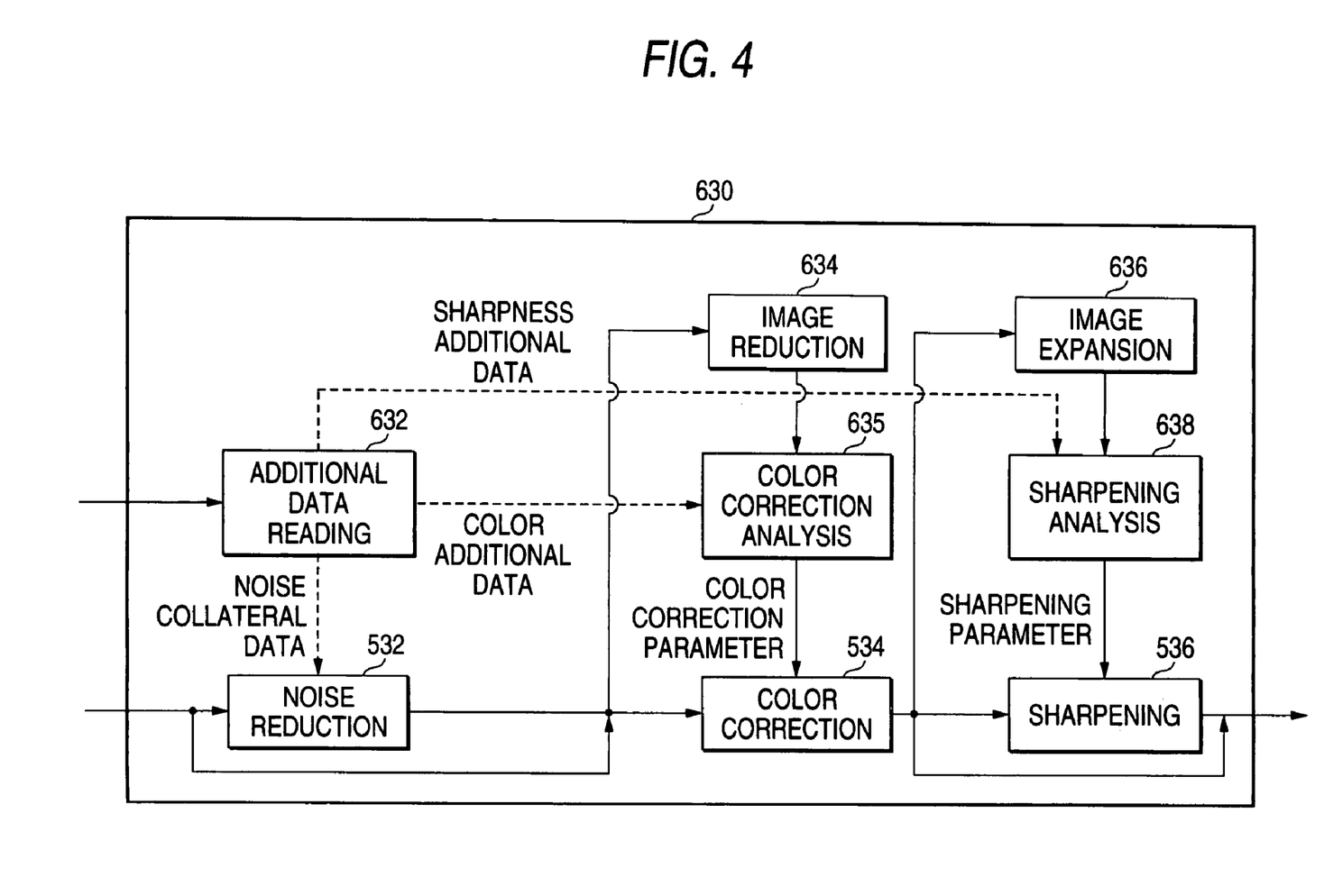
FIG. 4 is a diagram for explaining the arrangement of an image restoration unit according to a second embodiment of the present invention.

FIG. 4 is a diagram for explaining the configuration of an image restoration unit 630 according to the second embodiment of the present invention. The same reference numerals used in FIG. 2 are also employed to denote substantially corresponding components in FIG. 4.

As is shown in FIG. 4, the image restoration unit 630 for the second embodiment includes a noise reduction processor 532, a color correction processor 534, a sharpening processor 536, a additional data reader (reading unit) 632, an image reduction processor 634, a color correction analysis unit (parameter setting unit) 635, an image extraction unit 636 and a sharpening analysis unit (parameter setting unit) 638.

The additional data reader 632 reads from the image input unit 510 additional data corresponding to the correction process that the controller 560 has determined is to be executed. When the execution of the noise reduction process is determined by the controller 560, the additional data reader 632 reads additional data associated with the noise reduction process from the image input unit 510, and these additional data are employed to determine whether the noise reduction processor 532 should be bypassed. When the controller 560 determines that the noise reduction process should be skipped, the additional data reader 632 skips the reading of additional data associated with the noise reduction process, and image data are bypassed and transmitted to the color correction processor 534 and the image reduction processor 634.

The image reduction processor 634 reduces the received image data, and outputs the reduced image data to the color correction analysis unit 635.

The color correction analysis unit 635 analyzes the image data received from the image reduction processor 634, determines a color correction parameter based on the analysis results and the additional data that are associated with the color correction process and are received from the additional data reader 632, and outputs the color correction parameter to the color correction processor 534.

In accordance with the color correction parameter received from the color correction analysis unit 635, the color correction processor 534 performs color correction for the original image, which has not yet been reduced, and outputs the obtained image to the sharpening processor 536 and the image extraction unit 636.

When the controller 560 determines the sharpening process is to be executed, the image extraction unit 636 extracts the center portion of the image received from the color correction processor 534, and outputs the data for the center portion to the sharpening analysis unit 638.

The sharpening analysis unit 638 analyzes the center portion image data received from the image extraction unit 636, determines a sharpening parameter, based on the analysis results and the additional data that are received from the additional data reader 632 and are associated with the sharpening process, and outputs the sharpening parameter to the sharpening processor 536.

In accordance with the sharpening processor parameter received from the sharpening analysis unit 638, the sharpening processor 536 performs the sharpening process for the original image received from the color correction processor 534, and outputs the resultant image to an external unit, such as the image output unit 540. When, however, the controller 560 determines that the sharpening process is not to be executed, the additional data reader 632 skips the reading of the additional data associated with the sharpening process. Thus, the image data are bypassed via the sharpening processor 536, and are output by the image restoration unit 630.

As is described above, the image restoration unit 630 in this embodiment employs a reduced image or an extracted image segment to perform the analysis process and determine an image restoration parameter, so as to increase the analysis speed. Further, when additional data associated with the image restoration process are provided for an image to be processed, only the additional data concerning the execution of the correction process, which the controller: 560 has determined must be executed, must be read, so that the handling of the additional data can be simplified and the processing speed increased.

Third Embodiment

A third embodiment of the present invention will now be described.

In this embodiment, the processing method employed by the expansion/reduction unit 520 is changed, so that the processing load imposed on an image restoration unit 530 can be reduced even more, and the processing speed can be increased.

A modification of the first embodiment of the invention obtained by employing this viewpoint will now be described as the third embodiment.

Figure 5:
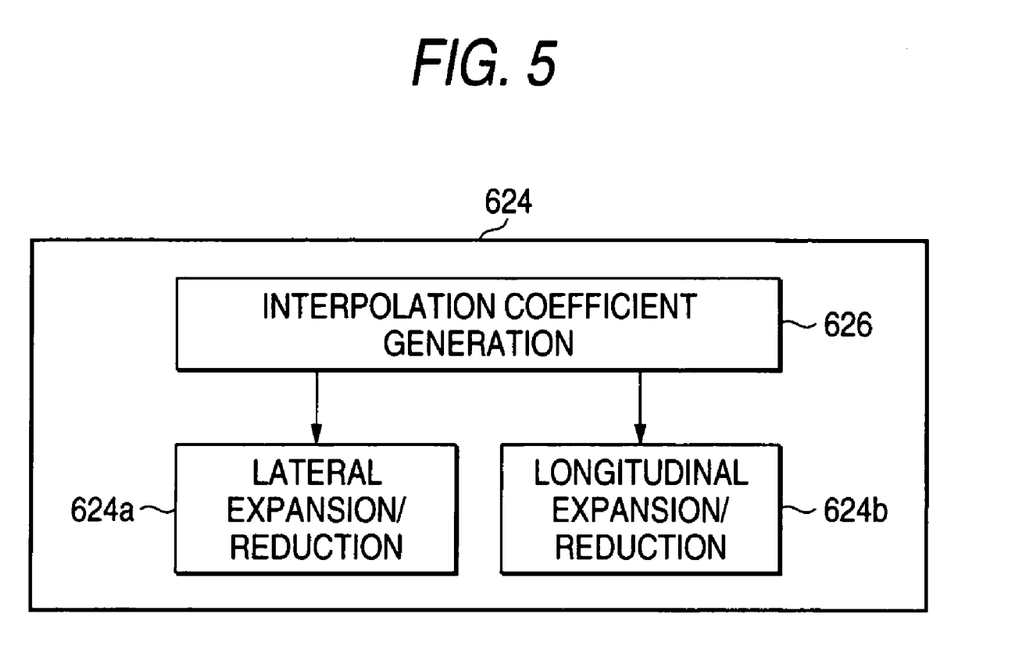
FIG. 5 is a diagram for explaining the arrangement of a high quality expansion/reduction processor according to a third embodiment of the present invention.

FIG. 5 is a diagram for explaining the configuration of a high quality expansion/reduction processor 624 according to a third embodiment of the present invention.

As is shown in FIG. 5, the high quality expansion/reduction processor 624 includes a lengthwise expansion/reduction processor 624a, a lengthwise expansion/reduction processor 624b and an interpolation coefficient generator 626.

Under the control provided by a controller 560, the interpolation coefficient generator 626 generates an interpolation coefficient used for the interpolation process, and outputs the interpolation coefficient to the lateral expansion/reduction processor 624a and the lengthwise expansion/reduction processor 624b.

The lateral expansion/reduction processor 624a and the lengthwise expansion/reduction processor 624b respectively perform the lateral (first direction) and lengthwise (second direction) expansion/reduction processes.

Based on the size of an image received from an image input unit 510 and the size of an image output by an image output unit 540, the controller 560 calculates the lateral and lengthwise magnifications for the image, and permits the high quality expansion/reduction processor 624 to perform the reduction process first, when the reduction is required. Specifically, assuming that the lateral magnification is 0.8 and the lengthwise magnification is 1.1, first, the controller 560 permits the lateral expansion/reduction processor 624a to laterally reduce the image 0.8 times; second, permits the image restoration unit 530 to perform the image restoration process; third, permits the lengthwise expansion/reduction processor 624b to lengthwisely expand the image 1.1 times; and finally, permits the image output unit 540 to output the resultant image.

In this manner, since the image can be processed separately in the lengthwise direction and in the lateral direction, the number of pixels to be processed by the image restoration unit 530 can be minimized, and the processing speed can be further increased.

Figure 6:
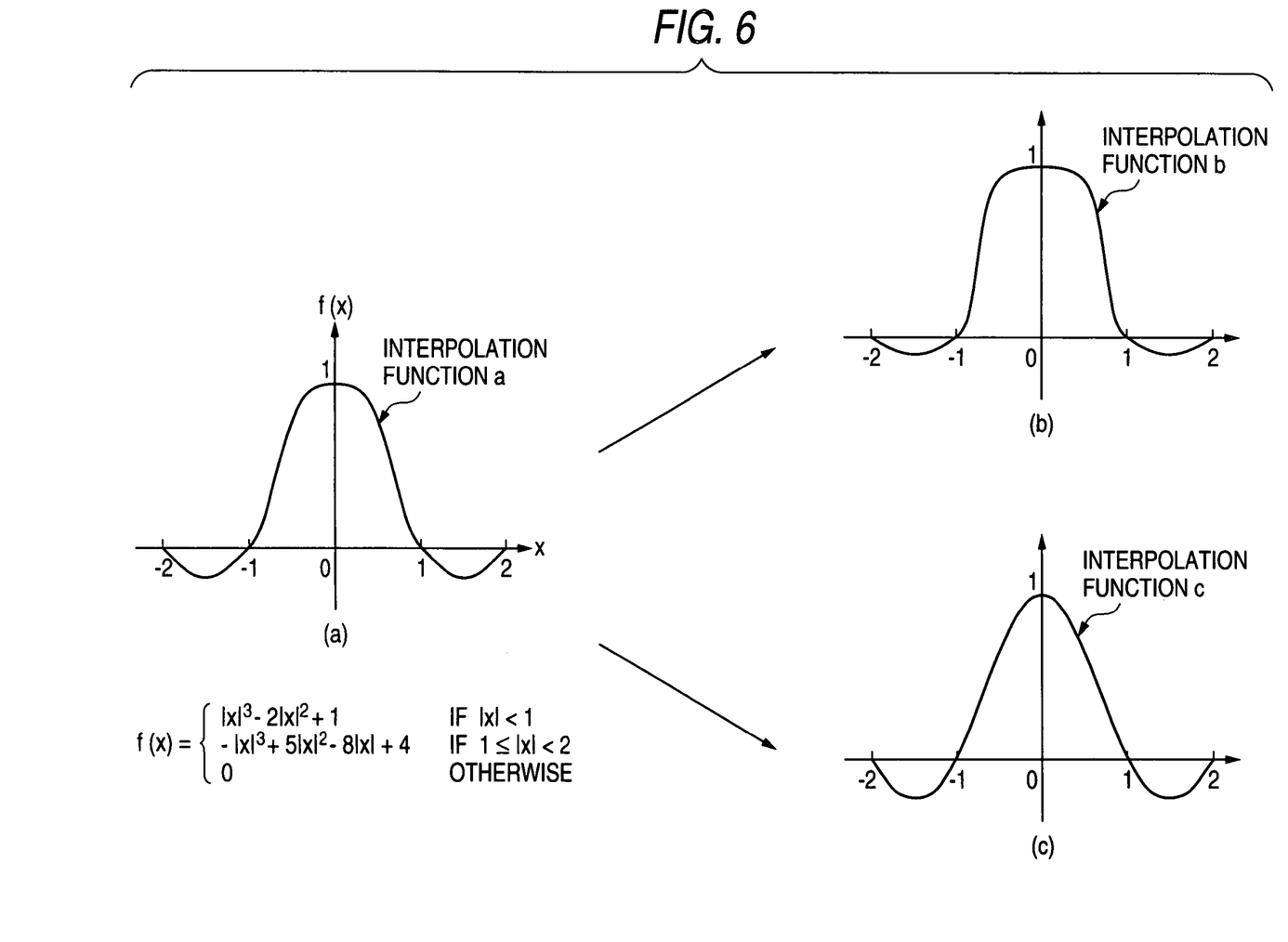
FIG. 6 is a graph showing example interpolation-functions, which are the origins of interpolation coefficients generated by an interpolation coefficient generator.

FIG. 6 is a diagram showing example interpolation functions that are the origins of interpolation coefficients generated by the interpolation coefficient generator 626.

An interpolation function a, shown in FIG. 6, is an interpolation function used for a high quality expansion/reduction process that is known as the cubic convolution method.

Based on the interpolation function a, the interpolation coefficient generator 626 calculates the interpolation coefficients, which the lateral expansion/reduction processor 624a and the lengthwise expansion/reduction processor 624b use to multiply reference pixels at the respective positions, and transmits the interpolation coefficients to these processors 624a and 624b.

When the controller 560 determines that the obtained magnification is for reduction, and that the noise reduction process should be performed by the image restoration unit 530, the interpolation coefficient generator 626 employs an interpolation function b to generate an interpolation coefficient. The interpolation coefficient b is the one obtained by moderating, along the f(x) axis, the recessed and raised shape of the interpolation function a. The interpolation coefficient that is generated, based on the interpolation function a, has a slight, high frequency enhancement characteristic, while the interpolation coefficient that is generated, based on the interpolation function b, has a high frequency attenuation characteristic, and can provide the same effects as those obtained by the noise reduction process. Therefore, the noise reduction process included in the image restoration operation can be skipped, and the period of time required for the reduction is not adversely affected, even when the interpolation function is changed, so overall, the processing speed can be increased.

Similarly, when the controller 560 determines that the magnification is for the expansion, and that the sharpening process should be performed by the image restoration unit 530, the interpolation coefficient generator 626 employs an interpolation function c to generate an interpolation coefficient used for the expansion. The interpolation function c is the one obtained by exaggerating the recessed and raised shape of the interpolation function a along the f(x) axis. Since the interpolation coefficient that is generated, based on the interpolation function c, has a stronger high frequency enhancement characteristic than has the one based on the interpolation function a, the sharpness of the image can be increased, and as a result, the same effect can be provided as is obtained by the sharpening process. Thus, the sharpening process included in the image restoration processing can be skipped, and the period of time required for expansion is not adversely affected, even by the changing of the interpolation function, and overall, the processing speed can be increased.

Furthermore, when the lateral and lengthwise magnifications are for reduction or for expansion, the interpolation coefficient generator 626 sets an interpolation function, so that the high frequency attenuation (noise reduction) characteristic, obtained by the noise reduction processor 532, or the high frequency enhancement (sharpness enhancement) characteristic, obtained by the sharpening process 536, can substantially be acquired. Then, the interpolation coefficient generator 626 transmits, to the lateral expansion/reduction processor 624a and the lengthwise expansion/reduction processor 624b, the interpolation coefficients that are obtained based on the interpolation function. Through this processing, the noise reduction process or the sharpening process can be skipped, and overall, the processing speed can be increased.

Further, when the lateral magnification is performed for reduction and the lengthwise magnification is performed for expansion, the lateral expansion/reduction processor 624a can perform the reduction process to additionally provide the noise reduction effects, and the lengthwise expansion/reduction processor 624b can perform the expansion process to additionally provide the sharpening effects. In this case, however, since the noise reduction effects in the lengthwise direction and the sharpening effects in the lateral direction are insufficient, it may be difficult to satisfactorily obtain the noise reduction effects and the sharpening effects. In this case, the noise reduction processor 532 must perform the noise reduction process only in the lengthwise direction, and the sharpening processor 536 must perform the sharpening process only in the lateral direction. Then, while as a whole the satisfactory effects can be maintained, the processing speed can be increased by performing the process in only one direction.

As is described above, the high quality expansion/reduction processor 624 in this embodiment can independently perform the expansion/reduction process in the lengthwise direction and the lateral direction. Therefore, when the lateral magnification and the lengthwise magnification differ, and both the expansion process and the reduction process must be performed, the number of pixels to be processed by the image restoration unit 530 can be minimized. And in addition, since the interpolation coefficient generator 626 changes the interpolation function used for expansion/reduction, the printing apparatus 1 can skip a part, or all, of the noise reduction process or the sharpening process included in the image restoration processing, and the processing speed for the image restoration can be increased.

As is described for the first to the third embodiments of the present invention, when a difference in the image quality is not discernible or is almost impossible to identify, and depending on the output image size, high quality image processing is not unnecessarily performed. Thus, an image processing apparatus can be provided that can implement the high speed processing and the high quality image processing can be provided.

Further, for the analysis process performed during the image restoration processing, instead of directly using an image to be processed, either the image is reduced or a part of the image is extracted, in accordance with the processing, and the correction parameter is obtained. Furthermore, when additional data are added to an image to be processed, only the additional data required for the process to be executed are read to determine the correction parameter. Therefore, the processing load imposed for the image restoration can be reduced, and the processing speed can be increased.

Moreover, by changing the interpolation function, the noise reduction effects or the sharpening effects are provided for the expansion/reduction process, so that a part or all of the noise reduction process or the sharpening process can be skipped. As a result, the processing load imposed by image restoration can be reduced, and the processing speed can be increased.

In these embodiments, the present invention is applied specifically for the printing apparatus 1. However, the present invention is not thereby limited and can be applied for a digital still camera, a scanner, a computer terminal or a handy phone, or a system for which several of them are assembled.

As is described above, according to the image processing apparatus, the image processing method and the image processing program of the invention, since the necessary and satisfactory processing is performed for the size output for an image, the image processing can be performed under optimal conditions wherein the image quality and the processing speed are balanced.

[FIG. 1]
1: printing apparatus
2: control unit
10: printer
20: main body
22: communication device
26: UI device
204: memory
240: recording medium

[FIG. 2]
5: image processing program
510: image input
520: expansion/reduction
522: fast expansion/reduction
524: high quality expansion/reduction
530: image restoration
532: noise reduction
534: color correction
536: sharpening
540: image output
560: control

[FIG. 3]
start
S100: Obtain image data.
S102: Output size>threshold value th?
S104: Output size>input size?
S106: All image restoration processes.
S108: High quality expansion.

S110: High quality reduction.
S112: All image restoration processes.
S114: Output size>input size?
S116: Color correction only.
S118: Fast expansion.
S120: Fast reduction.
S122: Color correction only.

End

[FIG. 4]
630: image restoration unit
532: noise reduction
534: color correction
536: sharpening
632: additional data reading
sharpness additional data
color additional data
noise additional data
634: image reduction
635: color correction analysis
636: image extraction
638: sharpening analysis
sharpening parameter

[FIG. 5]
624: high quality expansion/reduction processor
624a: lateral expansion/reduction
624b: lengthwise expansion/reduction
626: interpolation coefficient generation

[FIG. 6]
interpolation function a
interpolation function b
interpolation function c

What is claimed is:

1. An image processing apparatus comprising:
an image input unit that receives a digital image as an input image;
a controller that obtains a designated output size;
a first image expansion/reduction unit that employs a first method to change a size of an image;
a second image expansion/reduction unit that employs a second method to change a size of an image, the second method changing the size of the image at a higher speed than the first method; and
an image restoration unit that performs an image restoration process including a color correction process, a sharpening process and a noise reduction process for an image; wherein
[A] if any of (i) a total number of pixels obtained by multiplying a number of pixels of an output image having the designated output size in a row direction and a number of pixels of the output image having the designated output size in a column direction, (ii) both of the numbers of pixels of the output image having the designated output size in the row and column directions, (iii) the number of pixels of the output image having the designated output size in the row direction and (iv) the number of pixels of the output image having the designated output size in the column direction is larger than a predetermined value, the controller selects the first image expansion/reduction unit and controls the first image expansion/reduction unit and the image restoration unit so that the first method and the image restoration process for the digital image to generate the output image having the designated output size is performed, and [B] in the other cases, the controller selects the second image expansion/reduction unit and controls the second image expansion/reduction unit so that the second method and the image restoration process is performed while inhibiting at least one of the sharpening process and the noise reduction process, to generate the output image having the designated output size,
the first image expansion/reduction unit performs an expansion or reduction process in a first direction of a digital image and the expansion or reduction process in a second direction perpendicular to the first direction independently, and
if the controller selects the first image expansion/reduction unit, the controller controls an order of (i) the expansion or reduction process in the first direction, (ii) the expansion or reduction process in the second direction and (iii) the image restoration process so that a number of pixels of the image for which the image restoration process is performed is minimized.

2. The image processing apparatus according to claim 1, further comprising:
a parameter setup unit that sets correction parameters based on a reduced image obtained by reducing the digital image or an image segment extracted from the digital image, wherein
the image restoration unit performs either the color correction process or the sharpening process in accordance with the correction parameters.

3. The image processing apparatus according to claim 1, further comprising:
a reading unit that reads, from a plurality of additional data sets accompanying the digital image, one set of additional data consonant with the designated output size of the digital image, wherein
the image restoration unit performs the image restoration process in accordance with the additional data obtained by the reading unit.

4. The image processing apparatus according to claim 1, wherein
the first and the second image expansion/reduction units reduce the digital image based on an interpolation coefficient that provides noise reduction effects, and wherein
when the reduction process is performed based on the interpolation coefficient providing the noise reduction effects, the controller inhibits the image restoration unit from performing the noise reduction process.

5. The image processing apparatus according to claim 1, wherein
the first and second image expansion/reduction units expand the digital image based on an interpolation coefficient providing sharpness enhancing effects, and wherein
when the expansion process is performed based on the interpolation coefficient providing the sharpness enhancing effects, the controller inhibits the image restoration unit from performing the sharpening process.

6. The image processing apparatus according to claim 1, further comprising:
an operation unit that allows a user to input a command, wherein:
the control unit obtains the designated output size in accordance with the command.

* * * * *